United States Patent
Crofton et al.

(10) Patent No.: US 8,172,954 B2
(45) Date of Patent: *May 8, 2012

(54) APPARATUS FOR SIMULTANEOUS TWO-DISK SCRUBBING AND WASHING

(75) Inventors: Walter Crofton, Castro Valley, CA (US); Andrew Wypych, San Jose, CA (US)

(73) Assignee: Seagate Technology LLC, Cupertino, CA (US)

( * ) Notice: Subject to any disclaimer, the term of this patent is extended or adjusted under 35 U.S.C. 154(b) by 1734 days.

This patent is subject to a terminal disclaimer.

(21) Appl. No.: 10/435,293

(22) Filed: May 9, 2003

(65) Prior Publication Data

US 2004/0070859 A1 Apr. 15, 2004

Related U.S. Application Data

(60) Provisional application No. 60/417,432, filed on Oct. 10, 2002, provisional application No. 60/425,614, filed on Nov. 11, 2002.

(51) Int. Cl.
*B08B 7/00* (2006.01)
*B08B 7/04* (2006.01)
*B08B 3/00* (2006.01)

(52) U.S. Cl. ............ 134/32; 134/33; 134/26; 134/34; 134/6; 134/902

(58) Field of Classification Search .......... 134/32, 134/33, 26, 34, 902, 61, 66, 133, 116, 6; 15/77, 97.1, 88.2, 102, 88.3
See application file for complete search history.

(56) References Cited

U.S. PATENT DOCUMENTS

| | | | |
|---|---|---|---|
| 3,382,647 A | 5/1968 | Davey et al. | |
| 3,505,777 A | 4/1970 | Tsutsumi | 53/168 |
| 4,573,851 A | 3/1986 | Butler | 414/404 |
| 4,676,008 A | 6/1987 | Armstrong | 34/237 |
| 4,694,778 A | 9/1987 | Learn et al. | 118/728 |
| 4,695,217 A | 9/1987 | Lau | 414/404 |
| 4,768,328 A | 9/1988 | Mims | 53/532 |
| 4,819,579 A | 4/1989 | Jenkins | 118/728 |
| 4,840,530 A | 6/1989 | Nguyen | 414/404 |
| 4,856,957 A | 8/1989 | Lau et al. | 414/404 |
| 4,947,624 A | 8/1990 | Cones, Sr. et al. | 53/540 |
| 4,947,784 A | 8/1990 | Nishi | 414/404 |
| 4,958,982 A | 9/1990 | Champet et al. | 414/751.1 |

(Continued)

FOREIGN PATENT DOCUMENTS

EP 0 177 073 8/1985

(Continued)

OTHER PUBLICATIONS

Australian Written Opinion and Search Report, Dec. 17, 2004, Singapore Application No. SG200302857-8.

(Continued)

*Primary Examiner* — Alexander Markoff
(74) *Attorney, Agent, or Firm* — McCarthy Law Group

(57) ABSTRACT

Various methods and apparatus for simultaneously cleaning two single-sided hard memory disks is provided. The two disks are placed in concentric contact merge orientation such that the outwardly facing surface of each disk, which has memory storage capabilities, may be simultaneously cleaned by equipment designed to clean one double-sided disk. Conversely, no effort is expended in cleaning the abutting inactive surfaces of the disks.

32 Claims, 4 Drawing Sheets

U.S. PATENT DOCUMENTS

| | | | | |
|---|---|---|---|---|
| 4,962,879 | A | 10/1990 | Goesele et al. | 228/116 |
| 4,981,222 | A | 1/1991 | Lee | 211/41 |
| 4,987,407 | A | 1/1991 | Lee | 340/540 |
| 5,007,788 | A | 4/1991 | Asano et al. | 414/416.09 |
| 5,111,936 | A | 5/1992 | Kos | 206/334 |
| 5,125,784 | A | 6/1992 | Asano | 414/404 |
| 5,188,499 | A | 2/1993 | Tarng et al. | 414/404 |
| 5,203,360 | A * | 4/1993 | Nguyen et al. | 134/78 |
| 5,269,643 | A | 12/1993 | Kodama et al. | 414/416 |
| 5,314,107 | A | 5/1994 | D'Aragona et al. | 228/116 |
| 5,430,992 | A | 7/1995 | Olson | 53/399 |
| 5,486,134 | A | 1/1996 | Jones et al. | 451/209 |
| 5,501,568 | A | 3/1996 | Ono | 414/417 |
| 5,620,295 | A | 4/1997 | Nishi | 414/416.11 |
| 5,664,407 | A | 9/1997 | Cooper, III et al. | 53/542 |
| 5,820,449 | A | 10/1998 | Clover | 451/287 |
| 5,906,469 | A | 5/1999 | Oka et al. | 414/416 |
| 5,956,317 | A | 9/1999 | Komiyama et al. | 369/286 |
| 5,976,255 | A | 11/1999 | Takaki et al. | 118/500 |
| 5,991,104 | A * | 11/1999 | Bonyhard | 360/15 |
| 6,022,837 | A | 2/2000 | Oowaki | |
| 6,033,486 | A * | 3/2000 | Andros | 134/6 |
| 6,033,522 | A | 3/2000 | Iwata et al. | 156/345 |
| 6,086,961 | A * | 7/2000 | Bonyhard | 427/547 |
| 6,107,599 | A | 8/2000 | Baumgart et al. | 219/121.77 |
| 6,182,814 | B1 | 2/2001 | Koehler | 198/418.7 |
| 6,230,891 | B1 | 5/2001 | Usui et al. | |
| 6,345,947 | B1 | 2/2002 | Egashira | 414/225.01 |
| 6,354,794 | B2 | 3/2002 | Sato et al. | 414/811 |
| 6,368,040 | B1 | 4/2002 | Yamasaki et al. | 414/222 |
| 6,427,850 | B2 | 8/2002 | Mendiola | 211/41.18 |
| 6,438,781 | B1 * | 8/2002 | Ritchey et al. | 15/88.3 |
| 6,457,929 | B2 | 10/2002 | Sato et al. | 414/404 |
| 6,582,279 | B1 | 6/2003 | Fox et al. | 451/37 |
| 6,612,801 | B1 | 9/2003 | Koguchi | 414/416.02 |
| 6,625,835 | B1 | 9/2003 | Frost et al. | 15/77 |
| 6,626,744 | B1 | 9/2003 | White et al. | 451/66 |
| 6,769,855 | B2 | 8/2004 | Yokomori et al. | 414/416.02 |
| 6,821,189 | B1 | 11/2004 | Coad et al. | |
| 7,322,098 | B2 * | 1/2008 | Buitron et al. | 29/604 |
| 2002/0006324 | A1 | 1/2002 | Sato et al. | 414/416.12 |
| 2002/0100132 | A1 | 8/2002 | McMullen et al. | |
| 2003/0208899 | A1 | 11/2003 | Grow et al. | 29/458 |
| 2003/0209389 | A1 | 11/2003 | Buitron et al. | 184/6 |
| 2003/0209421 | A1 | 11/2003 | Buitron et al. | 204/192.2 |
| 2003/0210498 | A1 | 11/2003 | Kim et al. | 360/135 |
| 2003/0211275 | A1 | 11/2003 | Buitron et al. | 428/64.1 |
| 2003/0211361 | A1 | 11/2003 | Kim et al. | 428/694 R |
| 2004/0013011 | A1 | 1/2004 | Valeri | 365/200 |
| 2004/0016214 | A1 | 1/2004 | Buitron | 53/474 |
| 2004/0035737 | A1 | 2/2004 | Buitron et al. | 206/454 |
| 2004/0068862 | A1 | 4/2004 | Buitron et al. | 29/604 |
| 2004/0069662 | A1 | 4/2004 | Buitron et al. | 206/307.1 |
| 2004/0070092 | A1 | 4/2004 | Buitron et al. | 264/1.33 |
| 2004/0071535 | A1 | 4/2004 | Crofton et al. | 414/416.09 |

FOREIGN PATENT DOCUMENTS

| | | | |
|---|---|---|---|
| EP | 0 192 244 | 2/1986 | |
| EP | 768704 | 4/1997 | 414/416.02 |
| JP | 7-263521 | 10/1995 | 414/416.02 |
| JP | 08273210 | 10/1996 | |
| JP | 2001232667 | 8/2001 | |
| WO | WO 9836867 A1 | 8/1998 | |

OTHER PUBLICATIONS

Mar. 12, 2005 Invitiation to Respond to Written Opinion from Intellectual Property Office of Singapore to Tan Jinhwee, Eunice & Lim Chooeng.

"Design of an active memory system for network applications"; Asthana, A.; Cravatts, M.; Krzyzanowski, P.; Memory Technology, Design and Testing, Aug. 8-9, 1994; p. 58-63.

* cited by examiner

APPARATUS FOR SIMULTANEOUS TWO-DISK SCRUBBING AND WASHING

CROSS REFERENCE TO RELATED APPLICATIONS

Priority is claimed from U.S. Provisional Patent Application Serial Nos. 60/417,432 and 60/425,614, filed Oct. 10, 2002 and Nov. 11, 2002, respectively, which are incorporated by reference herein in their entirety.

The subject matter of the present application is related to the following applications, each of which has a filing date of May 9, 2003: U.S. patent application Ser. No. 10/434,550 entitled Single-Sided Sputtered Magnetic Recording Disks to Clasara et al. (Publication No. US-2003-0211361-A1); U.S. patent application Ser. No. 10/435,361 entitled Dual Disk Transport Mechanism Processing Two Disks Tilted Toward Each Other to Grow et al. (Publication No. US-2003-0208899-A1); U.S. patent application Ser. No. 10/435,358 entitled Information-Storage Media With Dissimilar Outer Diameter and/or Inner Diameter Chamfer Designs On Two Sides to Clasara et al. (Publication No. US-2003-0210498-A1); U.S. patent application Ser. No. 10/435,360 entitled Method of Merging Two Disks Concentrically Without Gap Between Disks to Buitron (Publication No. US-2004-0016214-A1); U.S. patent application Ser. No. 10/434,551 entitled Apparatus for Combining or Separating Disk Pairs Simultaneously to Buitron et al. (Publication No. US-2004-0035737-A1); U.S. patent application Ser. No. 10/435,572 entitled Method of Simultaneous Two-Disk Processing of Single-Sided Magnetic Recording Disks to Buitron et al. (Publication No. US-2003-0211275-A1); U.S. patent application Ser. No. 10/435,161 entitled W-Patterned Tools for Transporting/Handling Pairs of Disks to Buitron et al. (Publication No. US-2003-0209421-A1); U.S. patent application Ser. No. 10/435,295 entitled Method for Servo Pattern Application on Single-Side Processed Disks in a Merged State to Valeri (Publication No. US-2004-0013011-A1); U.S. patent application Ser. No. 10/434,547 entitled Method for Simultaneous Two-Disk Texturing to Buitron et al. (Publication No. US-2004-0070092-A1); U.S. patent application Ser. No. 10/435,227 entitled Cassette for Holding Disks of Multiple Form Factors to Buitron et al. (Publication No. US-2004-0069662-A1); U.S. patent application Ser. No. 10/434,546 entitled Automated Merge Nest for Pairs of Magnetic Storage Disks to Crofton et al. (Publication No. US-2004-0071535-A1); U.S. patent application Ser. No. 10/435,362 entitled Cassette Apparatus for Holding 25 Pairs of Disks for Manufacturing Process to Buitron et al. (Publication No. US-2004-0068862-A1); and U.S. patent application Ser. No. 10/434,540 entitled Method of Lubricating Multiple Magnetic Storage Disks in Close Proximity to Buitron et al. (Publication No. US-2003-0209389-A1). Each of these applications is incorporated by reference in its entirety as if stated herein. All of these applications are commonly owned by the Assignee.

FIELD OF THE INVENTION

The present invention relates to the processing of hard memory disks, typically used in hard disk drives. More specifically, it relates to various methods and apparatus for simultaneously cleaning the active surfaces of two single-sided hard memory disks.

BACKGROUND OF THE INVENTION

Hard disk drives are an efficient and cost effective solution for data storage. Depending upon the requirements of the particular application, a disk drive may include anywhere from one to eight hard disks and data may be stored on one or both surfaces of each disk. While hard disk drives are traditionally thought of as a component of a personal computer or as a network server, usage has expanded to include other storage applications such as set top boxes for recording and time shifting of television programs, personal digital assistants, cameras, music players and other consumer electronic devices, each having differing information storage capacity requirements.

Typically, hard memory disks are produced with functional magnetic recording capabilities on both sides or surfaces of the disk. In conventional practice, these hard disks are produced by subjecting both sides of a raw material substrate disk, such as glass, aluminum or some other suitable material, to numerous manufacturing processes. Active materials are deposited on both sides of the substrate disk and both sides of the disk are subject to full processing such that both sides of the disk may be referred to as active or functional from a memory storage stand point. The end result is that both sides of the finished disk have the necessary materials and characteristics required to effect magnetic recording and provide data storage. These are generally referred to as double-sided process disks. Assuming both surfaces pass certification testing and have no defects, both sides of the disk may be referred to as active or functional for memory storage purposes. These disks are referred as double-sided test pass disks. Double-sided test pass disks may be used in a disk drive for double-sided recording.

Conventional double-sided processing of hard memory disks involves a number of discrete steps. Typically, twenty-five substrate disks are placed in a plastic cassette, axially aligned in a single row. Because the disk manufacturing processes are conducted at different locations using different equipment, the cassettes are moved from work station to work station. For most processes, the substrate disks are individually removed from the cassette by automated equipment, both sides or surfaces of each disk are subjected to the particular process, and the processed disk is returned to the cassette. Once each disk has been fully processed and returned to the cassette, the cassette is transferred to the next work station for further processing of the disks.

More particularly, in a conventional double-sided disk manufacturing process, the substrate disks are initially subjected to data zone texturing. Texturing prepares the surfaces of the substrate disks to receive layers of materials which will provide the active or memory storage capabilities on each disk surface. Texturing may typically be accomplished in two ways: fixed abrasive texturing or free abrasive texturing. Fixed abrasive texturing is analogous to sanding, in which a fine grade sand paper or fabric is pressed against both sides of a spinning substrate disk to roughen or texturize both surfaces. Free abrasive texturing involves applying a rough woven fabric against the disk surfaces in the presence of a slurry. The slurry typically contains diamond particles, which perform the texturing, a coolant to reduce heat generated in the texturing process and deionized water as the base solution. Texturing is typically followed by washing to remove particulate generated during texturing. Washing is a multistage process and usually includes scrubbing of the disk surfaces. The textured substrate disks are then subjected to a drying process. Drying is performed on an entire cassette of disk drives at a time. Following drying, the textured substrate disks are subjected to laser zone texturing. Laser zone texturing does not involve physically contacting and applying pressure against the substrate disk surfaces like data zone texturing. Rather, a laser beam is focused on and interacts with discrete portions of the disk surface, primarily to create an array of bumps for the head and slider assembly to land on and take off from. Laser zone texturing is performed one disk at a time. The disks are then washed again. Following a drying step, the disks are individually subjected to a process which adds layers of material to both surfaces for purposes of creating data storage capabilities. This can be accomplished by sputtering, deposition or by other techniques known to persons of skill in the art. Following the addition of layers of material to each surface, a lubricant layer typically is applied. The lubrication process can be accomplished by subjecting an entire cassette of disks to a liquid lubricant; it does not need to be done one disk at a time. Following lubrication, the disks are individually subjected to surface burnishing to remove asperities, enhance bonding of the lubricant to the disk surface and otherwise provide a generally uniform finish to the disk surface. Following burnishing, the disks are subjected to various types of testing. Examples of testing include glide testing to find and remove disks with asperities that could affect flying at the head/slider assembly and certification testing which is writing to and reading from the disk surfaces. Certification testing is also used to locate and remove disks with defects that make the surface unuseable for data storage. The finished disks can then be subjected to a servo-writing process and placed in disk drives, or placed in disk drives then subjected to servo-writing. The data zone texturing, laser zone texturing, scrubbing, sputtering, burnishing and testing processes are done one disk at a time, with each surface of a single disk being processed simultaneously.

Although the active materials and manufacturing processes, by their nature, are difficult and expensive to employ, over the years, the technology used to manufacture hard memory disks has rapidly progressed. As a result, the density of information that can be stored on a disk surface is remarkable. Indeed, double-sided test pass disks used in personal computers have much greater storage capacity than most consumers require during the useful life of the computer. Consumers thus are forced to pay substantial amounts for excess storage capacity and the components to access the excess storage capacity. This has caused some disk drive manufacturers, in some current applications, to manufacture and sell disk drives which utilize only one side of a double-sided test pass disk for storage purposes or which use the good side of a double-sided process disk where one surface passed certification testing and the second surface failed. In either case, the second surface, despite being fully processed, is unused. However, the disk drive manufacturer reduces its cost by eliminating the mechanical and electrical components needed to access the unused disk surface. These disk drives are referred to as single-side drives and are typically used in low-end or economy disk drives to appeal to the low cost end of the marketplace. Although this approach may reduce some cost, it does not reduce the wasted cost of manufacturing the unused storage surface of each disk. Thus, substantial savings can be achieved by not only manufacturing disks with a single active or functional side, but doing so in a cost-effective manner.

In contrast to a double-sided disk, a single-sided disk has only one functional memory surface with active recording materials. It is not a double-sided process disk where one side is not accessed or where one side has failed testing. Rather, manufacturing processes are applied in a controlled manner only to one side of the disk using unique single-sided processing techniques. In contrast to conventional double-sided disks, active recording materials are only applied to, and full processing is only conducted on, one side of the disk. Thus, substantial savings are achieved by eliminating processing the second side of each disk.

Additionally, the present invention achieves advantages by utilizing conventional double-sided disk manufacturing equipment and processes, with limited modification. The present invention enables simultaneous processing of two substrate disks through the same equipment and processes used to manufacture double-sided disks. Simultaneously processing two substrate disks results in the production of two single-sided disks in the same time and using essentially the same equipment as currently is used in the production of one double-sided disk. However, each single-sided disk has only a single active or functional surface. For illustrative purposes FIG. 1 shows a side-by-side schematic representation of the processing of one double-sided disk $D_d$, depicted on the left side of FIG. 1, versus the simultaneous processing of two single-sided disks $D_s$, depicted on the right side of FIG. 1. In each case, the double-sided disk or the two single-sided disks are subjected to the same process steps 1 through N, but the single-sided disk processing produces two disks in the same time the double-sided disk processing produces one disk.

A benefit provided by simultaneous single-sided processing of disks is a substantial cost savings achieved by eliminating the application of materials to and processing of one side of each disk. A further, and potentially significant cost savings can be achieved by utilizing existing double-sided disk processing equipment, with limited modification, to process pairs of single-sided disks. A still further benefit is a substantial increase in production (or reduction in processing time depending upon perspective). By utilizing existing double-sided disk processing equipment, approximately twice the productivity of a conventional double-sided production process is achieved (on the basis of numbers of disks produced) in the production of single-sided disks. Moreover, these increased productivity levels are achieved at approximately the same material cost, excepting the substrate disk, as producing half as many double-sided disks.

The simultaneous processing is achieved by combining two substrate disks together into a substrate disk pair or disk pair. A disk pair is two substrate disks that are oriented in a back-to-back relationship with the back-to-back surfaces either in direct physical contact or closely adjacent with a slight separation. The separation can be achieved with or without an intervening spacer. The substrate disk pair progresses through each process step in much the same way as one double-sided disk, but with only the outwardly facing surface of each disk in the pair being subjected to the full process. Thus, the outwardly facing surface of each pair becomes the active or functional surface and the inwardly facing surface of each pair remain inactive or non-functional.

For convenience and understanding, the following terms will have the definitions set forth:

a) "R-side" and "L-side" refer to the active side and inactive side of a disk, respectively. R-side is the side that does or will have active recording materials and memory capability. The R-side may also be referred to as the active or functional side. The L-side is the side that has little or no active recording materials or memory capabilities; it is non-functional or inactive from a data storage stand point.

b) "Merge" means to bring two disks closer together to form a pair of disks, a disk pair or a substrate pair.

c) "Demerge," conversely, means that a merged pair of disks is separated from each other.

d) "Disk" means a finished memory disk and all predecessor configurations during the manufacturing process starting with a substrate disk and progressing to a finished memory disk, depending upon the context of the sentence in which it is used.

e) "Disk pair" or "substrate pair" means two disks positioned in contact merge, gap merge or spacer merge orientation.

f) "Double-sided disk" means a single disk which has been subjected to doublesided processing, whether or not both sides of the disk have passed testing or only one side has passed testing.

g) "Gap merge" means a pair of disks that have been merged, but a space is maintained between the two merged disks. One or more spacers may or may not be used to maintain the gap or space. Gap merge includes both concentric and non-concentric merge. It should be understood that there is no precise dimension or limit to the space between the disks that causes them to be gap merged. Gap merge also includes the situation where the gap between the disks gradually decreases from one perimeter edge to the opposite perimeter edge of the disks when the two disks are angled toward each other. An example is when the bottom perimeter edges of the disks are spaced apart and the upper perimeter edges are in contact.

h) "Single-sided disks" means a single disk which has been subjected to single-side processing, where only one surface of the disk is fully processed.

i) "Spacer merge" means a spacer body is used to create spacing between two gap-merged disks.

j) "Contact merge" means a merged pair of disks where the inside surface of each disk is in contact with the inside surface of the other disk. Contact merge includes concentric and non-concentric merge.

k) "Concentric merge" means that two merged disks have the same axis and, assuming the two disks have the same outside diameter and inside diameter (as defined by the center aperture), their outer and inner perimeter edges are aligned.

l) "Concentric contact merge" means a pair of disks that are oriented in both a contact merge and a concentric merge.

m) "Non-concentric merge" or "off-centered merge" means the two merged disks are not concentric to each other or their perimeter edges are not aligned.

n) "Non-concentric contact merge" means the two contact merged disks are not concentric to each other or their perimeter edges are not aligned.

Referring to FIG. 2, a cross-section of a pair of gap-merged disks is shown. The R-side (active or functional side) is the outwardly facing surface R of each disk within the pair. The L-side (inactive or nonfunctional side) is the inwardly facing surface L of each disk within the pair. In comparison, a cross-section of a pair of concentric contact merged disks is shown in FIG. 3. The relative orientation of the R-side and L-side of each disk remains the same, however, the L-side of each disk of the pair are in contact and the outer and inner perimeter P of each disk is aligned with the outer and inner perimeter P of the other disk.

A conventional double-sided disk is shown in FIG. 4. The left side surface is referred to as the "A" side and the right side surface is referred to as the "B" side. Both the A and B sides are subjected to processing, including the addition of active or magnetic materials. In contrast, with reference to FIGS. 2 and 3, the R-side of each disk in a pair of disks is oriented on the outside of the pair and is subjected to processing in the same fashion as the A and B sides of a double-sided disk. Conversely, the L-side of each disk in a pair of disks is oriented on the inside of the pair and is not subjected to full processing in the same fashion as the A and B sides of a double-sided disk.

SUMMARY OF THE INVENTION

These and other benefits are addressed by the various embodiments and configurations of the present invention. For example, the benefit provided by the present invention is an increased output in the production of finished disks achieved by cleaning and scrubbing two single-sided disks simultaneously. Another benefit is that, with limited modifications, the present invention can utilize existing processing equipment originally designed and built to clean and scrub double-sided disks for the processing of pairs of single-sided disks. This results in substantial capital equipment savings which would otherwise be spent unnecessarily modifying existing equipment or creating new equipment for cleaning and scrubbing single-sided disks.

The present invention is generally directed to methods and apparatus for cleaning and scrubbing the surface of two single-sided disks simultaneously. In single-sided disk manufacturing and, more specifically, in the cleaning and scrubbing process, it is preferable to process the disks in pairs. In one embodiment, the inactive or L-side surface of each disk within a pair of disks abuts the L-side surface of the other disk. This allows the outside surface, the R-side surface or active surface of each disk, to be cleaned simultaneously utilizing generally the same cleaning and scrubbing process equipment used to clean a single double-sided disk.

In one embodiment, a pair of gap merge disks are removed from a carrier containing a plurality of pairs of disks. The removed pair of disks is transferred to a cleaning and scrubbing zone where the upper outer edge of each disk contacts a pair of edge rollers. The edge rollers are configured to reposition the disks into a concentric contact merge orientation. A scrub brush is brought in contact with the R-side surface of each disk, further reorienting the disk pair into a concentric contact merge orientation by removing the remaining space between the disks. The edge rollers then rotate to impart a rotation to the pair of disks. The rotation may be clockwise or counter-clockwise. Simultaneously, the scrubbing brushes rotate upwardly to force the disk pair against the edge rollers. A cleaning solution is also applied to the disks and brushes. This process cleans and scrubs the R-side surface of each disk within the disk pair for a predetermined time period.

Preferably, there will not be any relative movement or slippage between the pair of disks during cleaning and scrubbing. If there were, the cleaning process would not be optimally performed and one or both disks may not be adequately or uniformly cleaned. Therefore, a certain amount of stiction between the contact merge disks is beneficial to ensure unified movement of the two disks. Stiction between the disks is enhanced by the fact that the L-side surfaces are relatively flat, the presence of a liquid film or layer between the contact merge disks and because of the inwardly and oppositely directed forces applied by the scrubbing brushes on the outside surfaces of each of the disks. The film of water between the disks acts as an adhesive. One way in which to create the liquid layer between the disks is to spray a fine mist between the disks while they are in a gap merge orientation.

At the end of the cleaning cycle, a lower lift saddle and upper guide saddle are positioned adjacent to the pair of disks for purposes of securing the position of the disk pair and allowing the edge rollers and scrubbing brushes to disengage. In the preferred embodiment, the upper and lower saddles will have outer edges which overlap the perimeter edges of the disk to prevent the processing equipment from losing control of the disk pair while the scrubbing brushes and edge rollers disengage. The upper and lower saddle members steady the position of the two disks following separation.

The disk pair may be demerged in a number of alternative ways. However, the demerge process is some what complicated by stiction occurring between the surfaces of the contact merge disks. In a first embodiment, each of the upper and lower disk securement saddles may be provided with a wedge portion which engages the interface between the two disks created by the contact between the L-side surface of each disk. As the upper and lower saddles move toward each other, the respective wedges of each saddle will force the disks apart and into separate disk receiving channels formed in the upper and lower saddles, or just the lower saddle. In a second embodiment, only the lower saddle includes a wedge and two disk receiving channels, but both of the upper and lower saddle members also include water jets focused to impart a controlled stream of water directly at the interface between the two disks. The chamfer formed on the outer perimeter edges of the disks creates a groove at the disk interface which facilitates separation of the disks by the water jets. Once the disks are physically separated by the action of the water jets, the wedge in the lower saddle member will mechanically maintain separation of the disks. The lower saddle member then lowers the pair of disks to a position in a receiving cassette. The cycle repeats itself with the next pair of disks in the cassette.

Although the cleaning and scrubbing process is preferably performed with the disks in a contact merge orientation, it is possible for the cleaning to occur with the disks in a gap merge orientation. However, because a force is applied against the outside surface of each disk, a spacer or other type of support would be needed to ensure the disks are not bent and optimal cleaning is achieved. Therefore, a contact merge orientation may be preferred.

The above-described embodiments and configurations are not intended to be complete nor exhaustive. As will be appreciated, other embodiments of the invention are possible utilizing, alone or in combination, one or more features set forth above and described below.

It should be understood that the drawings are not necessarily to scale. In certain instances, details which are not necessary for an understanding of the invention or which render other details difficult to perceive may have been omitted. It should be understood, of course, that the invention is not necessarily limited to the particular embodiments illustrated herein.

DETAILED DESCRIPTION OF THE PREFERRED EMBODIMENT

Figure 1:
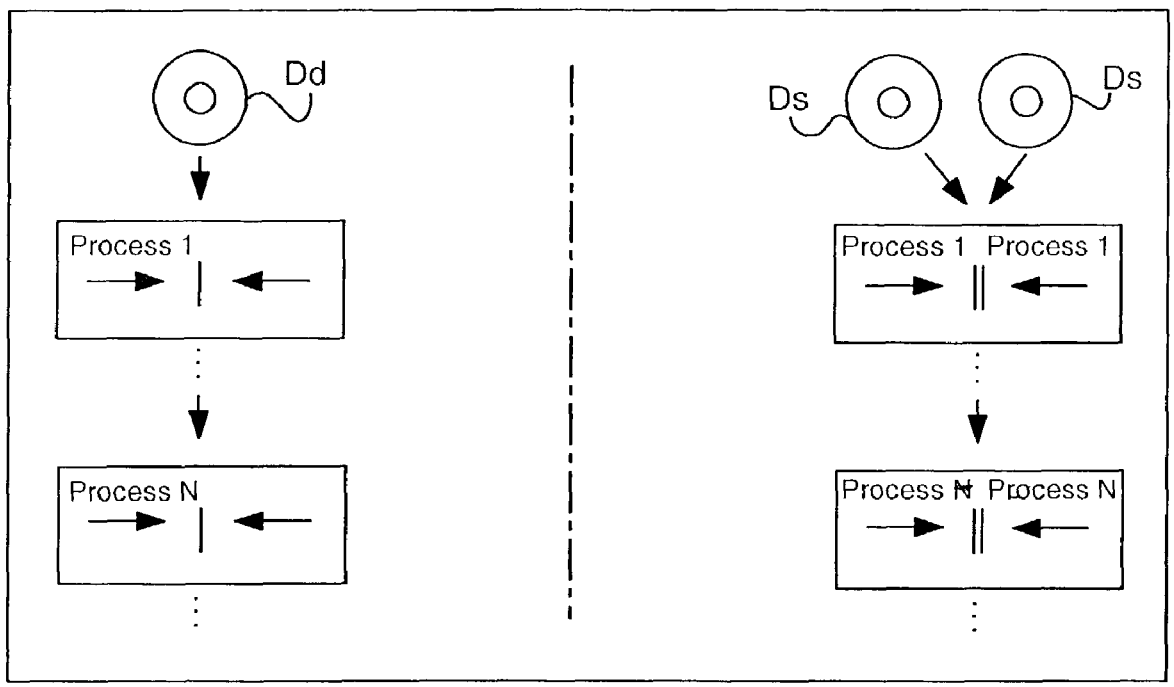
FIG. 1 is a schematic of a double-sided disk manufacturing process, showing process steps 1 through N on the left side of the illustration, and showing a single-sided disk manufacturing process of process steps 1 through N on the right side.
Figure 2:
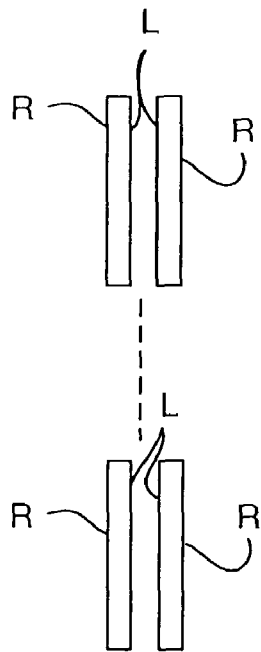
FIG. 2 is a cross-section of a gap merge pair of disks.
Figure 3:
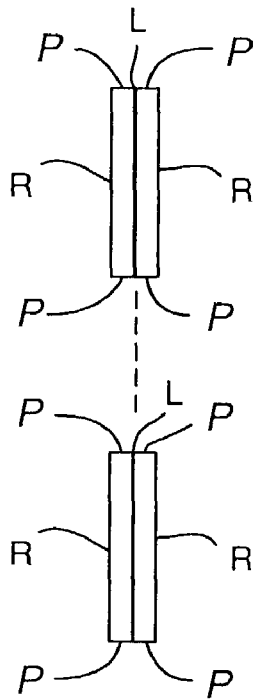
FIG. 3 is a cross-section of a concentric contact merge pair of disks.
Figure 4:
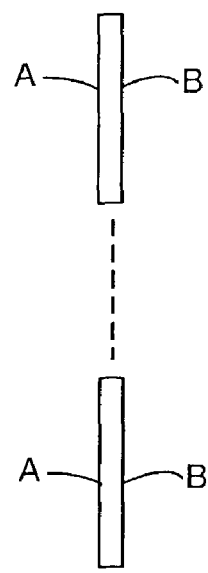
FIG. 4 is a cross-section of a double-sided process disk.
Figure 5:
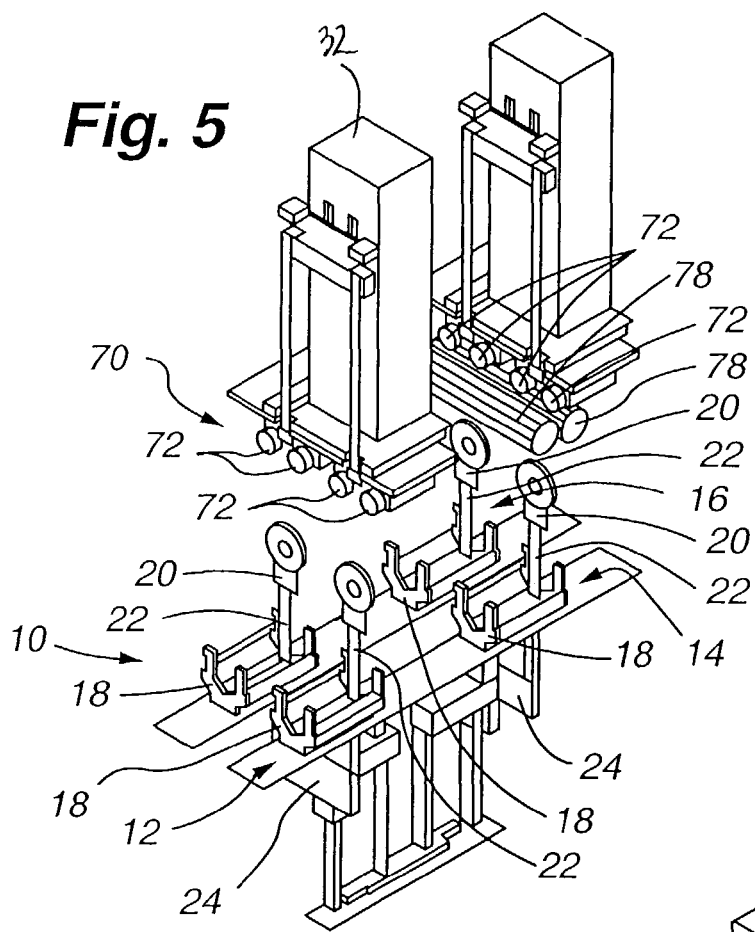
FIG. 5 is a perspective view of one embodiment of the disk scrubbing apparatus of the present invention.

In general terms, and as partially illustrated in FIG. 5, the preferred embodiment of the present apparatus provides four stations 10, 12, 14, 16 at which cassettes 18 containing a plurality of disks D are positioned. The cassettes 18 have an open top and open bottom to allow pairs of disks to be removed from and returned to the cassettes 10. A lift saddle 20 is positioned below each cassette and is affixed to a shaft 22. Each shaft 22 moves the lift saddle 20 vertically between a lower position, beneath the cassettes, and an upper position, above the cassettes and within a scrubbing zone where the disk pairs are subjected to scrubbing and washing. The individual shaft 22 may be interconnected, such as by plate 24, to facilitate uniform movement of each lift saddle. Thus, the actions of multiple scrubbing zones can be coordinated, and uniform efficient throughput achieved.

Figure 6:
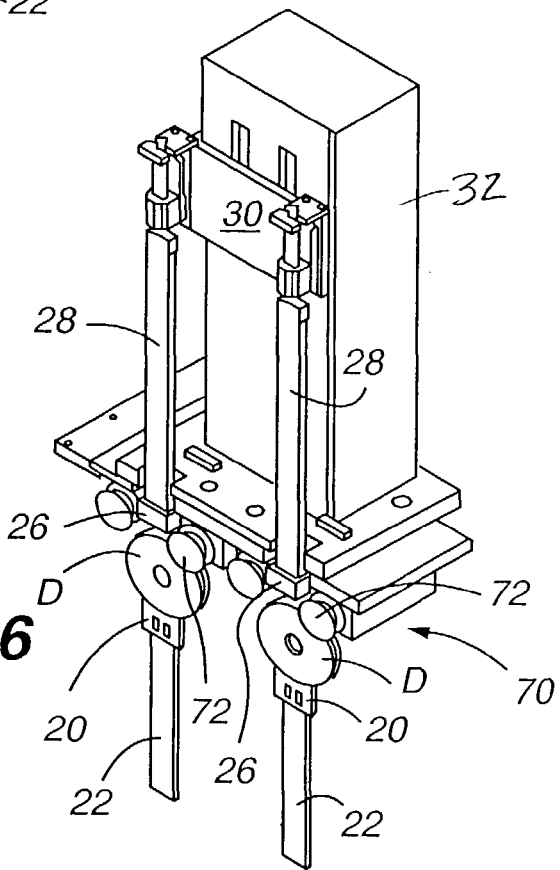
FIG. 6 is a perspective view of a portion of the scrubbing apparatus shown in FIG. 5, showing two pairs of disks positioned for scrubbing, although certain components have been removed, such as the scrubbing brushes, to better show the position of disks.

A complementary set of demerge saddles 26, affixed on demerge shafts 28, are vertically aligned with and positioned above the lifter saddles, as best illustrated in FIG. 6. The demerge saddles 26 and demerge shafts 28 move vertically between a first position and a second position. The demerge shafts 28 may also be interconnected by a plate or bracket 30 to facilitate uniform movement. As illustrated in FIGS. 5 and 6, the upper interconnector plate 30 is attached to a servo actuator 32 which moves the demerge saddle 26 and demerge shafts 28 between the first and second positions. Although not shown in FIG. 5 due to the complexity of the apparatus, the lower interconnect plates 24 are connected to similar actuators. The servo actuators provide precise, uniform and coordinated movement of the saddles 20 and 26. It should be appreciated that other means for moving the lifter saddle 20 and demerge saddle 26, such as pneumatic or hydraulic systems, may be utilized as would be known by persons of skill in the art.

Figure 7:
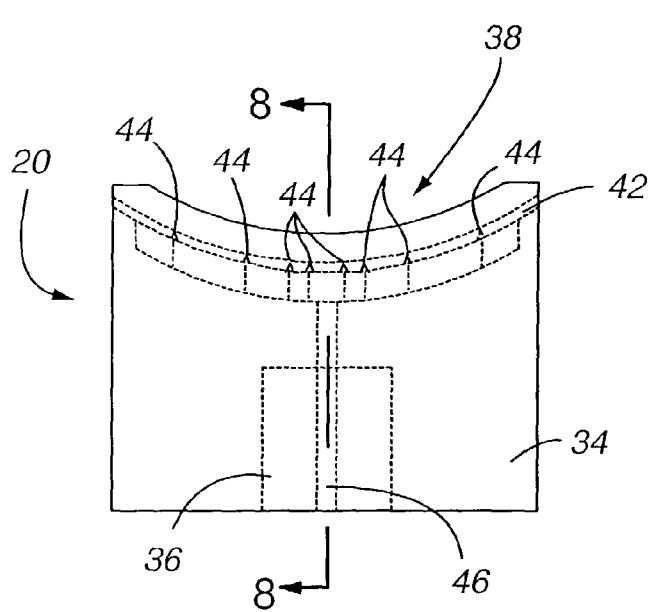
FIG. 7 is a front plan view of a lift saddle of the present invention.
Figure 8:
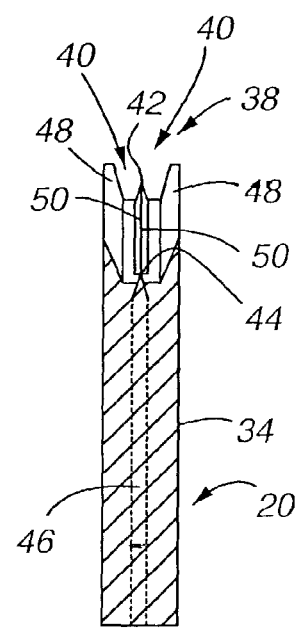
FIG. 8 is a cross-section taken along line 8-8 of the lift saddle of FIG. 7.

Turning to FIGS. 7 and 8, the lifter saddle 20 comprises a main body portion 34 attached to a shaft 22. In the preferred embodiment, a cavity 36 is formed in the body 34 of the lift saddle 20 to receive a shaft 22. The lift saddle 20 also includes a disk engagement portion 38 which engages the bottom perimeter edge of two disks. The engagement portion 38 includes two curved grooves or channels 40 separated by a center tooth or wedge 42. In addition, the center tooth or wedge 42 may include multiple high pressure jet openings or nozzles 44. The jet openings are connected to a manifold or fluid delivery system 46 which delivers deionized water or other appropriate fluids to the nozzles 44. A fluid source (not shown) is attached to the fluid delivery system 46. Alternative fluids include air or nitrogen.

The grooves or channels 40 in the disk engagement portion 38 of the lift saddle 20 are designed to maintain a pair of disks in gap merge orientation. Each channel 40 is formed by the inside surface 48 of the saddle 20 side wall and by the side wall 50 of the center wedge. These two surfaces are formed at an angle that approximates the angle of the chamfer 52 on the outer perimeter edge of a disk. The flat base portion 54 of the channel 40 approximates the width of the disk, less the chamfer portion. In one embodiment, the disks may be 95 millimeter in diameter and 0.050 inches thick, with a 45-degree chamfer. It should be appreciated that the present invention can be configured to work with a variety of disk sizes.

Other examples of alternative lift saddles are disclosed in a co-pending U.S. patent application Ser. No. 10/435,361 entitled "Dual Disk Transport Mechanism Processing Two Disks Tilted Toward Each Other", and U.S. patent application Ser. No. 10/435,161 entitled "W-Patterned Tools for Transporting/Handling Pairs of Disks", both filed May 9, 2003, the entirety of which are incorporated herein by reference as if stated herein.

In the preferred embodiment, four cassettes 10 are positioned at work station locations 10, 12, 14, 16. Additional work stations could be added or fewer could be employed. The cassettes contain a plurality of disks positioned in a single row, axially aligned. The disks are also preferably arranged in gap merge orientation (FIG. 21). A gap merge orientation cassette is described in co-pending U.S. patent application Ser. No. 10/435,362 entitled "Cassette Apparatus for Holding 25 Pairs of Disks for Manufacturing Process", filed May 9, 2003, the entirety of which is incorporated herein by reference as if stated herein. With 95 millimeter diameter disks having a thickness of approximately 0.050 inches, the space or gap between the disks comprising a pair may range from about 0.025 to 0.035 inches, with the preferable gap being about 0.035 inches. This gap allows a disk pair to utilize cleaning and scrubbing equipment originally designed and built to handle a single double-sided disk, without significant modifications. The cassettes 10 are also positioned in an indexing mechanism, not shown, which moves or advances the cassette incrementally over the lift saddle 20 after a processed pair of disks is returned to the cassette such that the next pair of disks can be removed and processed.

Figure 9:
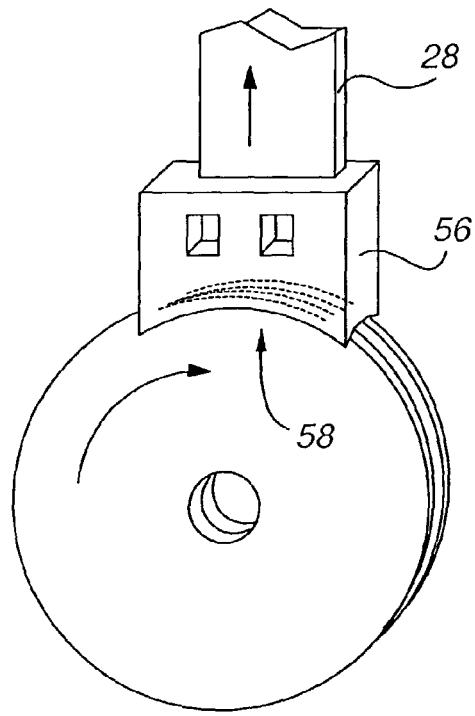
FIG. 9 is a perspective view of a pair of gap merge single-sided disks engaged by the upper demerge saddle of the present invention.
Figure 10:
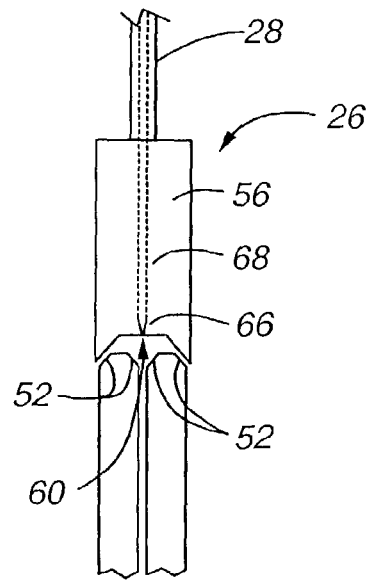
FIG. 10 is an end plan view of the apparatus shown in FIG. 9, further showing a fluid delivery path and water nozzle.

One embodiment of the demerge saddles 26 is best seen in FIGS. 9 and 10. The demerge saddle 26 includes a main body portion 56 and a disk engaging portion 58. The disk engaging portion 58 comprises a single groove or channel 60 formed by two angled side wall surfaces 62 and a flat bottom portion 64. The demerge saddle also includes a plurality of high pressure jets or nozzles 66 along the center of the flat portion 64. The nozzles 66 receive deionized water or other suitable liquid through a fluid delivery system 68.

In unison, the servo actuators 32 move the demerge saddle 26 and lift saddle 20 into a position of engagement with a pair of disks in each cassette 10. The lift saddle 20 and demerge saddle 26 then move vertically upwardly, in unison, to remove the pair of disks from the cassette and move the pair to a disk scrubbing zone 70. Alternatively, the pair of disks may be transported to the scrubbing zone 70 solely by the lift saddle 20. The demerge saddle 26 may remain positioned above the scrubbing zone 70 and engage the disk pair following scrubbing for purposes of stabilizing and demerging the disks prior to the lift saddle returning the pair to the cassette.

A fine mist may be applied throughout the scrubbing zone in order to form a liquid layer on the L-side of each disk prior to changing the orientation of the disk pair into a contact merge orientation. The mist may be continuously applied or intermittently applied as disk pairs move from the cassette to the scrubbing zone. The liquid layer assists in adhering the disks together so there is no relative movement between them.

Figure 11:
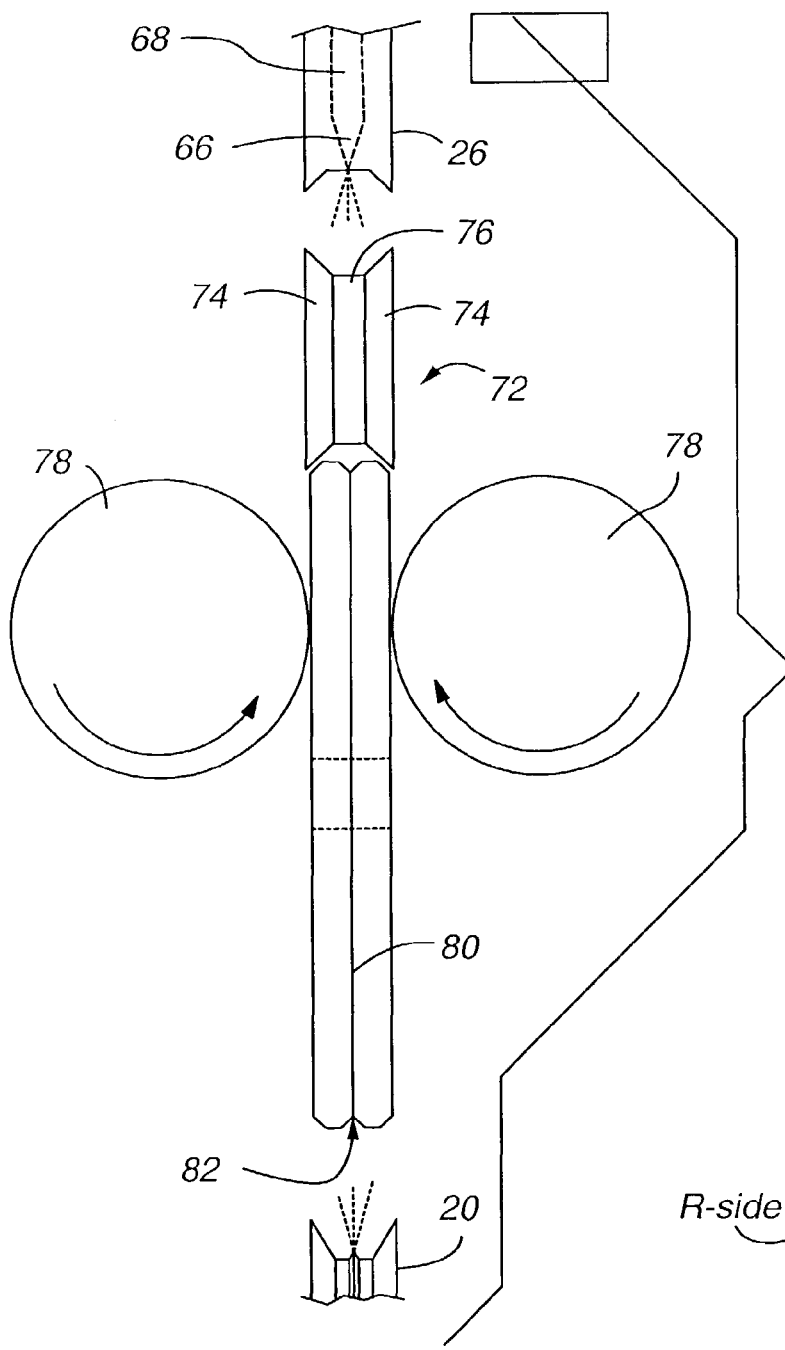
FIG. 11 is a schematic side elevation view showing the scrubbing operation of the present invention.

With reference to FIGS. 5, 6 and 11, as a pair of disks enters the disk scrubbing zone 70 from below by way of the lift saddle 20, the upper outer perimeter edges of the disks are engaged by a pair of edge rollers 72. The edge rollers 72 have angled inside walls 74 and a flat base portion 76. The edge rollers 72 partially convert the orientation of the disk pair into a concentric contact merge orientation by forcing the top portion of the disks together. A pair of scrubbing brushes 78 are positioned on each side of the disk pair, but initially spaced away from the disk pair in order that the upward movement of the disk pair is not impeded.

As noted above, it should be appreciated that one benefit of the present invention is achieving scrubbing and cleaning of two single-sided disks utilizing equipment designed and built to handle one double-sided disk. In this context, a conventional 95 millimeter double-sided disk generally has a thickness of approximately 0.050 inches, while a single-sided disk of the same diameter generally has a thickness of approximately 0.050 inches (or 0.10 inches for a pair). These dimensions become relevant when determining the permissible gap between two single-sided disks in a gap merge orientation. For example, two single-sided disks must travel vertically from the cassette 10 to the scrubbing zone 70 and between the scrubbing brushes 78. To avoid significant modifications to existing double-sided disk manufacturing equipment, the pair of disks must travel in a space created for a single double-sided disk. Therefore, the gap or space between the two single-sided disks must not be so large as to create an interference between the disks and the lift saddle on one hand, and the existing equipment on the other hand. An acceptable sized gap may range between 0.025 inches and 0.035 inches for disks having a thickness of 0.050 inches. Therefore, the overall thickness of the disk pair is no greater than approximately 0.135 inches, which permits existing processing equipment to be used. It should be appreciated that the spacing between the disks may vary depending upon the thickness of the disks.

The pair of rotating brushes 78 are brought in contact with the outward facing surfaces (R-side) of each disk in each pair of disks. This opposed and inward movement of the brushes 78 fully removes the spacing between the disks, as the lift saddle 20 and demerge tool 26 simultaneously disengage the pair of disks. In the embodiment shown in FIG. 5, two brushes are utilized for each disk pair, one on each side of the pair. In other embodiments, more than one brush could be used on each side of the disks. The brushes 78 rotate upwardly, as shown in FIG. 11, which forces the disks against the edge rollers 72 and secures the disks without the support of the lift saddle 20. The brushes also apply an inwardly directed force against the R-side surface of each disk. In one embodiment, the inward pressure applied by the brushes is between 20 and 30 pounds per square inch, and preferably 25 pounds per square inch. The edge rollers 72 are driven to impart rotation to the disk pair during scrubbing. In unison, the edge rollers 72 rotate the pair of disks and the brushes 78 rotate to scrub the rotating disks. Cleaning solution is applied to the disks in a manner known to those of skill in the art. The upward rotation of the brushes 78 against the disks maintains the concentric contact merge orientation of the disks against the edge rollers 72. The edge rollers 72 also maintain the disks in a concentric merge orientation due to the profile of the walls 74 and base 76. More precisely, the angled walls 74 correspond to the chamfer 52 of the outer edge of the disks and the width of the flat portion 76 corresponds to the thickness of the disk pair, less the chamfer portion 54. The flat bottom portion 76 also prevents lateral motion of one disk relative to the other.

Relative movement or slippage between the disks during cleaning and scrubbing can result in non-uniform and unacceptable cleaning, requiring the disks to be recleaned or scrapped. Therefore, a certain amount of stiction between the disks is desired to prevent such relative movement or slippage. Submerging the disk cassette in deionized water or another appropriate liquid creates a liquid film between the concentric contact merge disk pair which acts as an adhesive to hold the disks together without relative motion or slippage. The relative flatness of the unprocessed L-side surface of the disk, or substrate disk, also enhances stiction, as does the inwardly and opposed forces applied against the disks by the scrubbing brushes.

Figure 12:
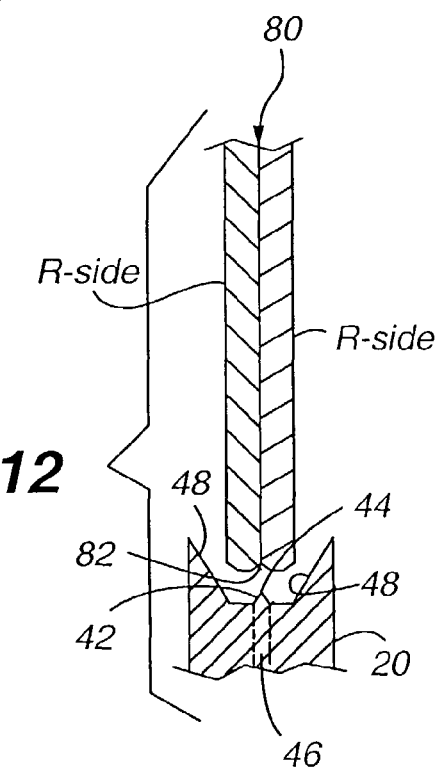
FIG. 12 is an enlarged cross-sectional view of a pair of concentric contact merge disks just prior to demerging by the lower lift saddle.

When scrubbing is complete, the servo actuators 32 move the lift saddle 20 and demerge saddle 26 into close proximity with the disks. FIG. 11 shows the lift saddle 20 and demerge saddle 26 removed from the scrubbing zone, such as during cleaning and scrubbing. FIG. 12 shows the lift saddle 20 positioned proximate the disk pair just before the scrubbing brushes 78 release the disks and move away. The demerge saddle 26 is similarly positioned proximate the upper perimeter edge of the disks. An important aspect of the transfer of disk support from the brushes 78 and edge rollers 72 to the lift saddle 20 and demerge saddle 26 is that the outer perimeter of the disks be positioned within the channels 40 and 60 of the lift saddle and demerge saddle such that when the brushes 78 disengage the disks, the disks cannot be dropped. Rather, the disks are captured within the channels 40 and 60.

At this point, in the preferred embodiment, the disk pair is returned to a gap merge orientation. This is necessary in order that the lift saddle 20 can secure the pair of disks and return them to the cassette 18, which is configured to receive disk pairs in a gap merge orientation. Initially, before the lift saddle 20 and demerge saddle 26 move towards each other the last incremental amount, shown in FIG. 12, to physically engage and secure the disk pair, water jets 44 and 66 are activated and directed at the interface 80 between the disks to force the disks apart. Facilitated by the groove 82 created by the inside chamfer on the perimeter edge of the disks, the jets will create approximately a 0.005 inch gap between the disks. Using this nozzle, a water pressure of 60 pounds per square inch is adequate to overcome stiction and separate the disk pair. The center wedge 42 of the lift saddle 20 will then mechanically increase the separation as the lift saddle and demerge saddle move toward each other and physically engage the disk pair. The beveled or angled sides of the wedge will force the disks into the two channels 40 of the lift saddle and the disks will be demerged. In a second embodiment, the demerge saddle 26 may include a wedge to assist in mechanical separation of the disk pair. In tandem, the servo actuators 32 move the lift saddle 20 and demerge saddle 26, together with gap merge disks, back to the cassette 18. Each cassette is then indexed to a new position to allow the process to be repeated with a new set of disk pairs. Alternatively, the demerge saddle 26 may remain in place, or withdraw slightly, while the lift saddle 20 returns the disks to the cassette 18.

The dual servo actuator systems 32 are programmable, accurate and offer simultaneous handling of disk pairs throughout the process.

The scrubbing process is only a part of the overall cleaning of the disks or substrate disks. Also, cleaning may occur at one or more times during the overall manufacturing process. For example, cleaning may follow data zone texturing or laser zone texturing. Typically, before scrubbing, the disks are initially subjected to a pre-soak in soapy water to loosen and remove organic materials and other particulates. While in the pre-soak, the liquid is subjected to ultrasound which turbulates the liquid and assists in removing unwanted particulate. The process is conducted while the disks are in cassettes. Next the disks, still within the cassettes, are subjected to a rinse of clean water. Scrubbing, as described above, typically follows the initial soak and rinse. Following scrubbing, the cassettes and disks proceed through a series of additional rinse steps and are then subjected to a drying cycle. The drying is preferably performed in a spin dryer, with the disks still in the cassettes. It should be appreciated, in order to achieve optimum drying, the disks should not be in a contact merge orientation, rather, at a minimum they should be in a gap merge orientation. Moreover, placing the disk pairs in a gap merge orientation may be efficient for processing purposes because the next process may preferably utilize disks in a gap merge orientation. Accordingly, placing the disks in a gap merge orientation following cleaning may not require reorienting the disks for the next process.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the invention.

Moreover, though the description of the invention has included description of one or more embodiments and certain variations and modifications, other variations and modifications are within the scope of the invention, e.g. as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method of manufacturing single-sided hard memory disks, comprising:
   a. placing a plurality of disks in a selected carrier included in a plurality of carriers each configured for transporting disks;
   b. removing a pair of the disks from the selected carrier with a gap between the pair of disks;
   c. removing the gap between the pair of disks to place the pair of disks in a contact merge orientation;
   d. after (c) and while the pair of disks are still removed from the selected carrier from (b) and still in the contact merge orientation from (c), simultaneously scrubbing the outside surfaces of the pair of disks with rotating brushes;
   e. after (d) and while the pair of disks are still removed from the selected carrier from (b), forming another gap between the pair of disks; and
   f. after (e), placing the pair of disks in one of the plurality of carriers.

2. The method of claim 1, further comprising adding a liquid layer between the contacting surfaces of the disks prior to removing the gap from between the pair of disks to increase stiction between the disks in the contact merge orientation.

3. The method of claim 1, wherein placing a plurality of disks in a selected carrier comprises positioning the disks in spaced axial alignment and in pairs, with a first spacing between pairs of disks being larger than a second spacing between disks comprising a pair.

4. The method of claim 3, wherein the second spacing between disks comprising a pair is between approximately 0.025 and 0.070 inches.

5. The method of claim 4, wherein the second spacing between disks comprising a pair is approximately 0.035 inches.

6. The method of claim 1, wherein removing the gap between the disks further comprises aligning the outside perimeter of the two disks forming the pair of disks.

7. The method of claim 1, wherein removing a pair of disks from the selected carrier further comprises removing adjacent disks from the selected carrier.

8. The method of claim 1, wherein placing a plurality of disks in a selected carrier comprises positioning the disks in spaced axial alignment.

9. The method of claim 1, wherein removing a pair of the disks from the selected carrier comprises engaging the pair of disks with a saddle.

10. The method of claim 1, wherein removing the gap between the pair of disks comprises engaging the perimeter of the disks forming the pair of disks with a plurality of rollers having a single channel for receiving both disks.

11. The method of claim 1, wherein forming another gap between the pair of disks comprises forcing a liquid between the pair of disks in the contact merge orientation.

12. The method of claim 1, wherein forming another gap between the pair of disks comprises forcing a wedge device between the pair of disks in the contact merge orientation.

13. The method of claim 1, further comprising repeating (b) through (f) for the remaining disks in the selected carrier.

14. The method of claim 13, further comprising adjusting the position of the selected carrier each time a pair of disks is returned to the selected carrier following scrubbing.

15. The method of claim 1, wherein removing the gap between the disks forming the pair of disks comprises squeezing the pair of disks between the brushes.

16. The method of claim 1, wherein scrubbing the disks with brushes further comprises rotating the pair of disks during scrubbing.

17. A method of manufacturing single-sided hard memory disks, comprising:
 a. placing a plurality of disks in a selected carrier included in a plurality of carriers each configured for transporting disks;
 b. removing a pair of the disks from the selected carrier with a gap between the pair of disks;
 c. merging the pair of disks into a contact merge orientation;
 d. after (c) and while the pair of disks remain removed from the selected carrier from (b) and still in the contact merge orientation from (c), simultaneously scrubbing the R-side surfaces of the pair of disks with opposed rotating brushes;
 e. after (d) and while the pair of disks remain removed from the selected carrier from (b), demerging the pair of disks; and
 f. after (e), placing the pair of disks in one of the plurality of carriers.

18. The method of claim 17, further comprising rotating the pair of disks in unison while cleaning the R-side surfaces.

19. The method of claim 17, wherein placing a plurality of disks in a selected carrier comprises positioning the disks in spaced axial alignment and in pairs, with a first spacing between pairs of disks being larger than a second spacing between disks comprising a pair.

20. The method of claim 17, wherein merging the pair of disks further comprises positioning the disks forming the pair of disks in a concentric contact merge orientation.

21. The method of claim 17, wherein demerging the pair of disks comprises forcing a liquid between the pair of disks in the contact merge orientation.

22. The method of claim 17, wherein demerging the pair of disks comprises forcing a wedge device between the pair of disks in the contact merge orientation.

23. The method of claim 17, wherein simultaneously cleaning the R-side surfaces of the pair of disks further comprises rotating the pair of disks during scrubbing.

24. The method of claim 17, wherein merging the pair of disks comprises squeezing the pair of disks between the brushes.

25. A method comprising:
 a. placing first and second disks back to back in a contact merge orientation;
 b. after (a), rotating the first and second disks simultaneously;
 c. during (b), simultaneously cleaning the exposed outer surface of each disk;
 d. after (c) and while the first and second disks remain in the contact merge orientation, containing portions of opposing exposed surfaces of the first and second disks in a demerge device;
 e. after (d), demerging the first and second disks to a gap merge orientation while the opposing exposed surfaces remain contained by the demerge device; and
 f. after (e) and while the first and second disks remain in the gap merge orientation, transporting the first and second disks via the demerge device to a carrier.

26. The method of claim 25, wherein placing the first and second disks in the contact merge orientation further comprises substantially concentrically aligning the outer perimeter of the disks.

27. The method of claim 25, wherein rotating the pair of disks simultaneously comprises engaging the outer perimeter of each disk with a plurality of edge rollers.

28. The method of claim 25, wherein simultaneously cleaning the exposed outer surface of each disk comprises applying a rotating brush to the exposed outer surface of each disk.

29. The method of claim 25, wherein the contacting surfaces of each disk in the contact merge orientation are inactive surfaces for memory storage purposes.

30. The method of claim 25, wherein the exposed surfaces of each disk in the contact merge orientation are active surfaces for memory storage purposes.

31. The method of claim 25, wherein the demerging the first and second disks comprises introducing a pressurized fluid between the abutting disks in the contact merge orientation.

32. The method of claim 25, wherein the demerging the first and second disks comprises forcing a wedge device between the abutting disks in the contact merge orientation.

* * * * *